(12) United States Patent
Gulli' et al.

(10) Patent No.: US 7,801,893 B2
(45) Date of Patent: Sep. 21, 2010

(54) SIMILARITY DETECTION AND CLUSTERING OF IMAGES

(75) Inventors: Antonino Gulli', Pisa (IT); Antonio Savona, Sora (IT); Tao Yang, Santa Barbara, CA (US); Xin Liu, Piscataway, NJ (US); Beitao Li, Piscataway, NJ (US); Ankur Choksi, Somerset, NJ (US); Filippo Tanganelli, Castiglioncello (IT); Luigi Carnevale, Pisa (IT)

(73) Assignee: IAC Search & Media, Inc., Oakland, CA (US)

( * ) Notice: Subject to any disclaimer, the term of this patent is extended or adjusted under 35 U.S.C. 154(b) by 529 days.

(21) Appl. No.: 11/242,390

(22) Filed: Sep. 30, 2005

(65) Prior Publication Data

US 2007/0078846 A1    Apr. 5, 2007

(51) Int. Cl.
    *G06F 17/30* (2006.01)
(52) U.S. Cl. .......................... 707/737; 707/758
(58) Field of Classification Search ............... None
    See application file for complete search history.

(56) References Cited

U.S. PATENT DOCUMENTS

| | | | |
|---|---|---|---|
| 6,202,061 B1 * | 3/2001 | Khosla et al. .................. 707/3 |
| 6,285,999 B1 | 9/2001 | Page |
| 6,563,959 B1 | 5/2003 | Troyanker |
| 6,658,423 B1 | 12/2003 | Pugh et al. |
| 6,681,060 B2 | 1/2004 | Acharya et al. |
| 6,751,363 B1 * | 6/2004 | Natsev et al. ............... 382/305 |
| 6,804,684 B2 | 10/2004 | Stubler |
| 7,155,033 B1 * | 12/2006 | Naveen et al. .............. 382/108 |
| 7,366,718 B1 * | 4/2008 | Pugh et al. ...................... 707/6 |
| 2002/0087538 A1 * | 7/2002 | Abdel-Mottaleb et al. ..... 707/6 |
| 2002/0131641 A1 | 9/2002 | Luo et al. |
| 2003/0074368 A1 * | 4/2003 | Schuetze et al. ......... 707/103 R |
| 2004/0163034 A1 * | 8/2004 | Colbath et al. .............. 715/500 |
| 2004/0220963 A1 * | 11/2004 | Chen et al. .............. 707/103 R |
| 2005/0084154 A1 | 4/2005 | Li et al. |
| 2005/0120311 A1 | 6/2005 | Thrall |
| 2005/0125374 A1 | 6/2005 | Curtis et al. |
| 2005/0125376 A1 | 6/2005 | Curtis et al. |
| 2005/0234972 A1 * | 10/2005 | Zeng et al. .............. 707/103 R |
| 2005/0251532 A1 * | 11/2005 | Radhakrishnan et al. . 707/104.1 |
| 2006/0204142 A1 * | 9/2006 | West et al. .................. 382/305 |

OTHER PUBLICATIONS

C. E. Jacobs, et al. ("Fast Multiresolution Image Querying," pp. 277-286, Los Angeles, Aug. 1995).*

Beeferman et al. ("Agglomerative Clustering of a Search Engine Query Log". Proceedings of the 2000 Conference on Knowledge Discovery and Data Mining (Boston, MA), pp. 407-416, Aug. 2000).*

(Continued)

*Primary Examiner*—Neveen Abel Jalil
*Assistant Examiner*—Son T Hoang
(74) *Attorney, Agent, or Firm*—Stephen M. De Klerk; Sonnenschein, Nath & Rosenthal LLP

(57) ABSTRACT

A system and method for determining if a set of images in a large collection of images are near duplicates allows for improved management and retrieval of images. Images are processed, image signatures are generated for each image in the set of images, and the generated image signatures are compared. Detecting similarity between images can be used to cluster and rank images.

17 Claims, 12 Drawing Sheets

OTHER PUBLICATIONS

Li.B., Chang. E.Y., "Discovery of a Perceptual Distance Function for Measuring Image Similarity." ACM Multimedia Jouranl Special Issue on Content-Base Image Retrieval, vol. 8, No. 6, Apr. 2003, pp. 512-522.

Qamra, A., Meng, Y., and Chang E. Y., "Enhanced Perceptual Distance Functions and Indexing for Image Replica Recognition." IEEE Transaction on Pattern Analysis and Machine Intelligence (PAMI), V. 27, No. 3, Mar. 2005, pp. 379-391.

Sethi, I.K., Coman, I., Day, B., Jiang, F., Li, D., Segovia-Juarez, J., Wei, G., You, B., "Color-WISE: a system for image similarity retrieval using color." Proc. SPIE, vol. 3312, Storage and Retrival for Image and Video, pp. 140-149.

Da Rugna, J., Konik, Hubert., "Similarity distances evaluation for query by example retrieval systems." Internet Imaging IV. Edited by Santini, Simone; Schettini, Raimondo. Proceedings of the SPIE. vol. 5018, (2003), pp. 304-315.

Gunhan, P., Baek, Y., Lee, H.K., "Majority Based Ranking Approach in Web Image." CIVR 2003 pp. 111-120.

Sun, J.T., Zeng, H.J., Liu, H., Lu, Y., Chen, Z., "CubeSVD: a novel approach to personalized Web search." WWW 2005, pp. 382-390.

Franklin, Curt, "How Internet Search Engines Work." Retrieved Sep. 19, 2005, from http://computer.howstuffworks.com/search-engines.htm/printable.

Chuck, J., Finkelstein, A., Salesin, D., (1995). Fast Multiresolution Image Querying. Retrieved Sep. 9, 2005 from the University of Washington, Computer Science and Engineering Department website: http://www.grail.cs.washington.edu/projects/query.

Mork. P., Li, B., Chang, E., Cho, J., Li,C., Wang,J., "Indexing Tamper Ressistant Features for Image Copy Detection." Retrieved Sep. 29, 2005 from Stanford University, Computer Science Department from: http://www-db.stanford.edu/~wangz/project/imcopy/SIGMOD00/copydet.pdf.

Natsev, A., Rastogi, R., Kyuseok, S., "WALRUS: A Similarity Retrieval Algorithm for Image Database." From http://www.cs.duke.edu/~natsev/papers/walrus-full.pdf.

Chang, Y.E., Wang, Z. J., Li, C., Wiederhold, G., "RIME: A Replicated Image Detector for the World Wide Web." Retrieved Sep. 29, 2005 from Stanford University, Department of Computer Science website: http://www-db.stanford.edu/~wangz/project/imcopy/IMCOPY98/rime.pdf.

Xi, W., Zhang, B., Chen, Z., Lu, Y., Yan, S., Ma, W.Y., Fox, A.E., "Link Fusion: a unified link analysis framework for multi-type interrelated data objects." Proceedings of the13th International conference on World Wide Web, New York, New York. 2004.

"Clever" International Business Machine. Retrieved Sep. 29, 2005, from http://www.alamaden.ibm.com/cs/k53/clever.html.

* cited by examiner

Image Search Results for
"Intersecting Lines"
100

101

102

103

104

105

106

107

108

109

SIMILARITY DETECTION AND CLUSTERING OF IMAGES

FIELD

At least one embodiment of the present invention pertains to information management and retrieval in general, and more particularly, to detection of similarity between images for large-scale image search.

BACKGROUND

The World Wide Web (the "Web") provides a breadth and depth of information to users. Typically, a user accesses portions of the information by visiting a World Wide Web ("Web") site. Due to the rapid growth of the Web and the number of Web sites accessible via the Web, it is often difficult for a user looking for information about a particular topic to determine if a Web site exists that contains such information, which Web site to go to, or what the Uniform Resource Locator (URL) is for a web site of interest.

As a result of a desire by users to search for relevant Web sites related to the users' topics of interests, some Web sites provide search engines or other capabilities that allow users to provide one or more search terms or keywords. For example, the Web site provided by iWon, Inc., of Irvington, N.Y., USA, provides a search capability on the home page of its Web site at www.iwon.com. Besides searching for text, users also search for images on Web sites. Once a user enters one or more image search terms or keywords, the search engine provides search results based on the search terms or keywords. Such search results include a set or one or more images from Web sites corresponding to the search terms or keywords. Typically, the search engine provides a set of image thumbnails that the users can use to see larger versions of images, as well as to connect to the web pages on which the images are located.

When searching for an image, a search engine typically displays an image search result containing multiple duplicate or near duplicate images. Duplicates or near-duplicates of images abound on the Web because users often copy and paste popular images, e.g., the Mona Lisa, from one Web site to another. Users may also scan in and place images, such as music album covers, on Web sites. Further, the same image can also be found on one or more Web sites in multiple formats, such as Raster image formats (RIFs), Graphic Interchange Format (GIF), Joint Photographic Experts Group (JPEG), and so on. Because multiple duplicates or near duplicates of any given image exist on the Web, when a user uses a search engine to search for the given image, the duplicates or near duplicates appear in the search result display.

The abundance of duplicate and near duplicate images in a search engine result list is problematic in that it can be frustrating for a user looking for images. For instance, the user may have to click through several pages of redundant image search results displayed by the search engine before finding the image the user was looking for. The search engine also requires tremendous resources, such as processing power and storage, to store and search through the large number of redundant images.

Some techniques to find exact replicas of images in an image search result exist. These techniques typically use a Message Digest 5 (MD5) hashing technique to determine if two images are exact binary equals of each other. These techniques are flawed in that a small change to an image will result in two very similar, albeit not duplicate, images to be presented in a set of image search results. For instance, two images may be near duplicate when there is a difference in size, color, chroma channels, luminance, background, texture, or storage format, or one may be a cropped version of the other, or one may be an edited version of the other, or one may have some text superimposed on it. Two images may be near duplicates when one is derived through one or more transformations of the other.

Another method of determining similarity in images is to compare the images pixel by pixel. However, this method is also very limited in is use. For instance, the method is useless when comparing an image stored multiple times using different storage formats. Using different storing formats not only yields different file formats, but also results in changes in the pixels themselves. Most popular formats perform a destructive compression altering the content of the picture, such that the decompressed picture is different pixel by pixel from the original one. Thus, a pixel comparison would fail in determining images that are similar. For instance, GIF reduces the number of colors in the image to 256, while JPEG alters the content itself and introduces artifacts that although are hardly visible to the eye, yet alter the pixel content of the original uncompressed picture.

Detecting whether or not images are near duplicates, is very difficult, particularly in large collections of documents, such as on the Web. Thus, despite the state-of-the-art in Web sites and image search engines, there remains a need for a method and apparatus for determining similarity in images for a large-scale image search.

SUMMARY OF THE INVENTION

The present invention includes methods and related apparatus for similarity detection and clustering of images for large-scale image search. In one embodiment, the method includes pre-processing the set of images, generating an image signature for each image in the set of images, and comparing the generated image signatures. In another embodiment, the method includes generating clusters of near-duplicate images. In certain embodiments, a method of ranking an image based on determining images that are near-duplicates of the image is discussed.

Other aspects of the invention will be apparent from the accompanying figures and from the detailed description that follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

A method and apparatus for detecting near duplicate images in a collection of images are described. As described further below, in certain embodiments of the invention, the method includes generating image signatures for each image in the collection of images and comparing the signatures to determine a level of similarity between images or groups of images. Various methods for reducing computational costs of detecting near duplicate images are also described.

Figure 1:
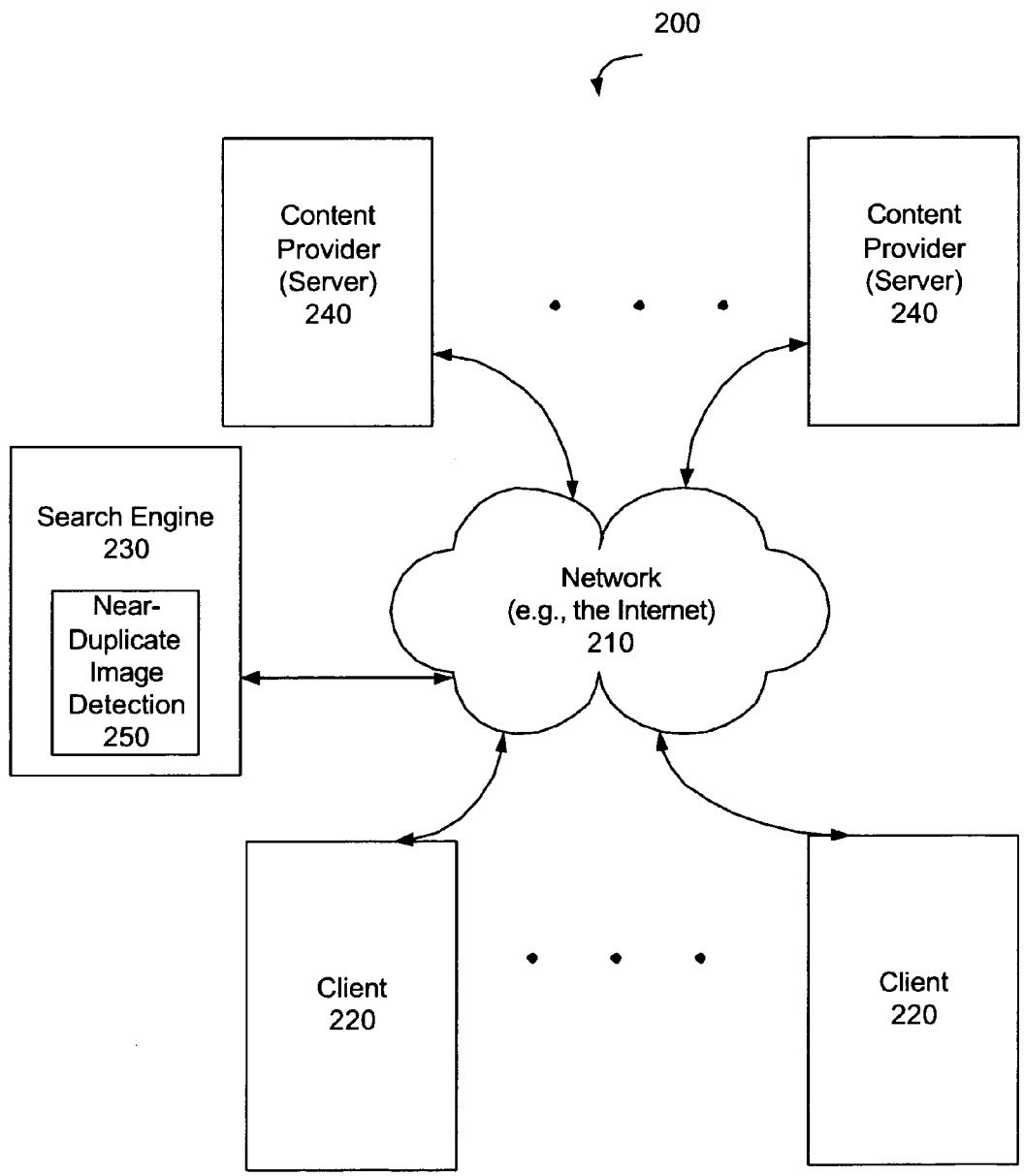
FIG. 1 is a high-level block diagram of an environment in which at least some aspects of the present invention may be used.

FIG. 1 is a high-level block diagram of an environment 200 in which at least some aspects of the present invention may be used. This environment 200 may include a network (such as the Internet, for example) 210 that enables users to access content provided by one or more servers 240 coupled via one or more communication networks. The data may be stored in files on the servers 240 and may be accessed by users using client systems 230 coupled to the servers 240 to the communication networks. The term "client system" is intended to refer to any computer system or similar mechanism that is used by a user to request information or data stored by a server or to request a service provided by a server. The term "server system" is intended to refer to any computer system or similar mechanism that stores information and provides the information in response to a user request received from a client computer, and/or provides some service. A particular computer system may function both as a client and as a server. The client system 220 may be, for example, a personal computer (PC) or a hand-held device such as a personal digital assistant (PDA) or cellular telephone.

In certain embodiments, when the images to be searched are located online on the Web, the client system 220 may use a software application known as a browser to allow the user to access the Web. The browser can be used to access a search engine 230 to search for and access remotely stored content, such as images. Internet search engines 230 are special sites on the Web that are designed to help users find information, such as images, stored on other sites.

The search engine 230 may perform crawling to collect content, such as images, indexing/sorting the content, for instance, to associate images with words or phrases, and query processing functions to respond to a search query using the index to generate search results. The search engine 230 also ranks or orders the images. The search engine 230 may crawl the network 210 to get content from servers 240, store retrieved content in databases on servers online or off-line, generate a content index, accept queries from users and return query results based on the content index. The search engine 230 also has an input/output interface to receive a query from a client and to transmit the query results to the client.

According to certain embodiments of the invention, search engine 230 includes near duplicate image detection module 250 to determine images that are at least near duplicates of each other. An example of an Internet search engine 230 is one provided by Ask Jeeves® of Oakland, Calif. The searching methods discussed herein can also be used to access images stored offline, e.g. in an offline database.

Figure 2:
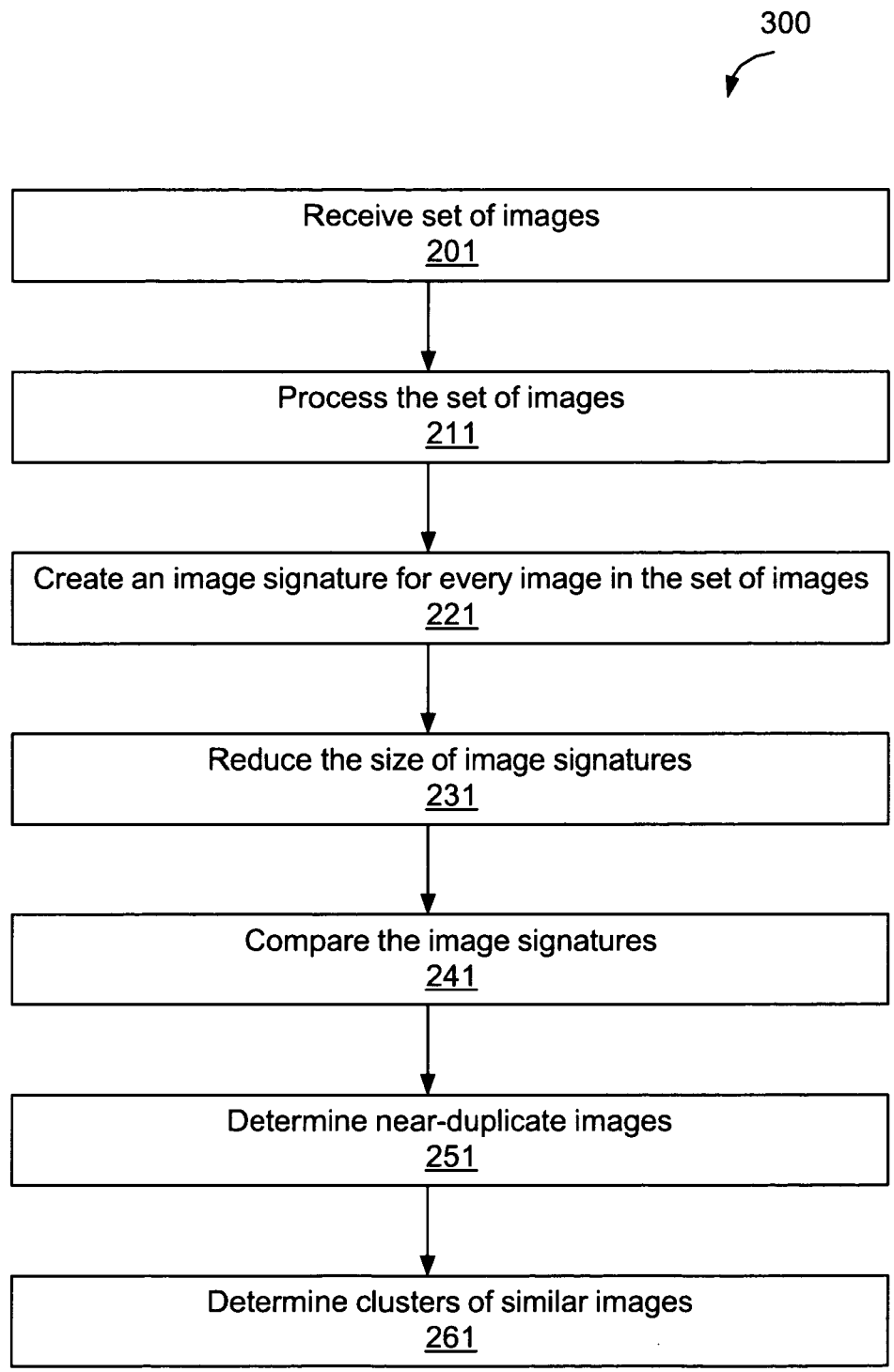
FIG. 2 is a high-level flow diagram showing a process of determining clusters of near duplicate images in a large collection of images, according to certain embodiments of the invention.

FIG. 2 shows an example of the overall process 300 that may be performed by the near duplicate image detection module 250 to detect similarity in images. By detecting near duplicates of images, the near duplicate image detection module 250 also detects images that are exact duplicates of each other.

Initially, at block 201 in FIG. 2, the search engine 230 receives a set of images. The set of images may be received, for instance, as a result of searching an image index using a search term provided by a user. At block 211, the set of images received at block 201 is pre-processed, as discussed in reference to FIG. 3.

Figure 3:
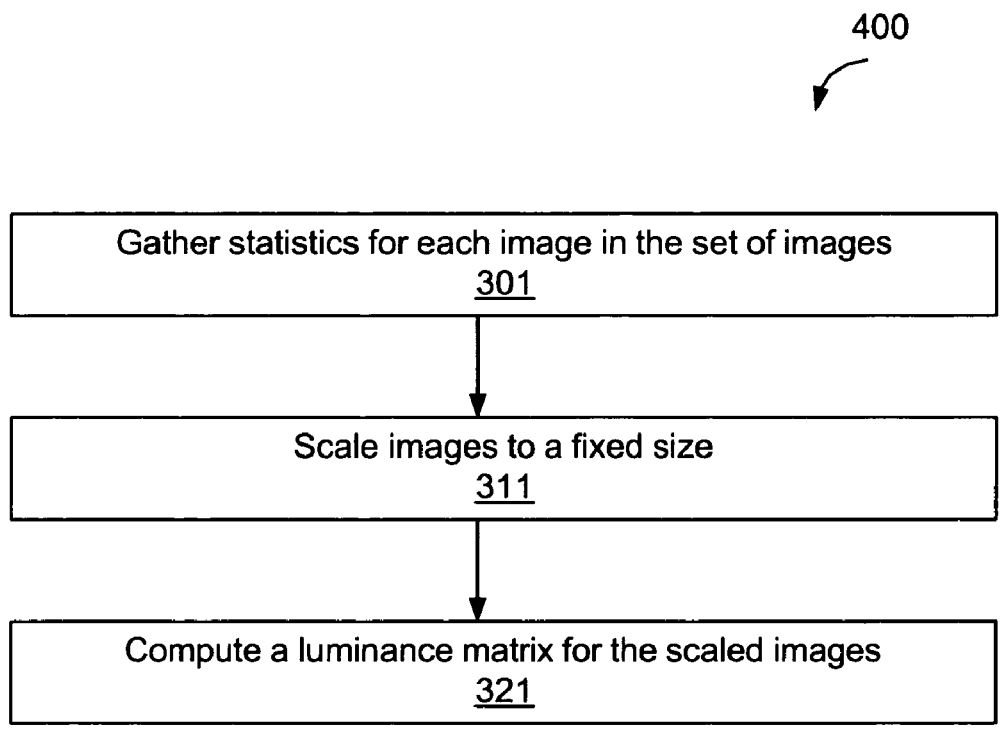
FIG. 3 is a high-level flow diagram showing a process of pre-processing the large collection of images, according to certain embodiments of the invention.

FIG. 3 shows an example of the overall process 400 that may be performed by the search engine 230 to pre-process a set of images received as a result of searching using the image search term. Alternatively, in case of an offline database of images, the set of images that are pre-processed may be contained in a database of images stored offline. According to certain embodiments of the present invention, in either case, only a subset of the set of images is pre-processed. The subset may be chosen to improve performance characteristics, such as speed of similarity detection and time elapsed before results can be displayed. Alternatively, or in addition, the subset may be chosen based on a user's preference.

Referring to FIG. 3, at block 301, for each image in the set (or subset) of images, certain computations are made to gather statistics. According to certain embodiments of the present invention, aspect ratio ("AR"), a mean value for each chroma channel in the Red-Green-Blue ("RGB") color space, and other features derived from them, such as, YUV, hue, and saturation, are computed and stored. The aspect ratio of an image is the ratio of the width of the image to the height of the image. The RGB chroma or color space stores information about distinct primary colors (red, green, and blue) in each chroma channel. In certain embodiments, the gathered statistics are saved in an external memory, such that the image processing in accordance with method 300 can be carried out offline.

At block 311, each image in the set of images is scaled from its original dimensions to a fixed size (M by M) using a resizing algorithm, such as the Lanczos algorithm. Scaling is used to implement a process that is independent of the original dimensions of the image. The scaling thus reduces the level of computational complexity required to compare images of different sizes. In this way, the computational costs of the process do not depend on the size of the original image. Furthermore, the scaling identifies minor errors in the aspect ratio that often result when a user scans a picture to place the picture on a Web page. Scaling the images to a uniform size further enables the search engine 230 to detect two images that are near duplicates but are different in size. Alternatively or in addition to scaling the images to a uniform size, the aspect ratio of the images can also be used to detect images that are near duplicates but are different in size, because two images that have similar aspect ratios are more likely to be near duplicates of each other.

At block 321, a luminance matrix for the scaled images is extracted. Luminance is the weighted sum of the linear RGB components of an image, proportional to intensity. According to certain embodiments of the present invention, the YUV model is used, which defines a color space in terms of one luminance component (Y component) and two chrominance components (U and V components). The YUV model or color space can be created from the saved mean values for the chroma channels in the RGB color space that stores information about distinct primary colors in each channel, as discussed with reference to block 301. The luminance matrix is used to gather information pertaining to the shapes, instead of color, contained with the scaled images. In one embodiment, this is accomplished by discarding the U and V channels and using only the Y channel that gives a black and white version of the original image. The black and white version retains the shape information for the source image. In this way, the Y channel can be used to determine a measure of similarity in the shapes of the images.

Using the Y channel to create the luminance matrix is advantageous in that it is very efficient from a processing point of view. Using a luminance matrix and discarding U and V components reduces the number of computations required in determining similarity. Further, building the luminance matrix is highly efficient. Specifically, the processing required to build the luminance matrix is linear, not exponential, in comparison to the size of set of images. Further, because the luminance matrix has a size of M by M, and the value of "M" can be changed, the accuracy of the entire similarity detection process can be determined.

Referring again to FIG. 3, at block 221, an image signature is created for every image in the set of images. In certain embodiments, a wavelet signature is created for each image in the set of images. Accordingly a wavelet transform is used to create a wavelet signature over the luminance matrix. The wavelet transform is a well known mathematical transform that utilizes the notion that wavelet coefficients for a certain function contain both frequency and time domain information. Wavelet transform is typically created by repeatedly filtering select image coefficients on a row-by-row and column-by-column basis. After each transform pass (once through each row and column), the low pass coefficients of the image may be transformed again. The transformation process may be repeated many times depending on the size of the image. The wavelet signature thus obtained is a matrix having a size of M by M. In particular, each element of this matrix is a double precision floating point number. In certain embodiments, only a few important coefficients from thousands of coefficients for each color channel are kept to distill from them a very small signature for each image. Alternatively, other signature creation methods such as Fast Fourier Transform (FFT) can be used.

At block 231, the signatures are quantized to reduce the size of the signatures. According to certain embodiments, to reduce the size of the original wavelet signature that is an M by M matrix, a vector that stores only the non-zero coefficients of the matrix is generated. The reduced wavelet signature vector has "n" number of sets having three values (x, y, z), where "x" is the column number of the non-zero coefficient, "y" is the corresponding number, "z" is the value of the non-zero coefficient, and can be "1" or "−1", and "n" is equal to the number of non-zero coefficient in the M by M matrix. According to certain embodiments, the signatures are sorted starting from the top left and moving right for each row starting from the top one and moving to the bottom one. For instance, the 4×4 matrix having rows (1 1 0 0), (0 0 1 −1), (0 0 0 0), and (0 0 0 0), can be represented with the following vector made of four triplets (x,y,z) (0,0,1), (1,0,1), (2,1,1), and (3,1,−1). The vector illustrates a value of "1" in position (0,0), a value of "1" in position (1,0), a value of "−1" in position (2,1), and a value of "−1" in position (3,1). This is a simple representation of sparse matrix, and the invention exploits the fact that M is very often sparse. The size of M can be selected and the number of wavelet coefficients can also be selected, and thus it can be known exactly how many non-zero elements the matrix will have. For instance, if M is equal to 128 and the number of wavelet coefficients is 128, then there can only be 128 non-zero elements in a matrix of size 128 by 128. According to certain embodiments, if M is chosen to be 128, the signatures are thus reduced to a value less than 1 Kbyte. The reduction in size however, does not cause a reduction in the quality of the similarity detection because a signature of about 400 bytes is a high quality signature.

At block 241, the reduced image signatures created for every image in the set of images are compared to each other. Thus, in order to compute the differences between two images, the reduced signatures are used to build a matrix for each image. The matrices represent an approximation of the original luminance matrix and can be compared to each other to determine a level of similarity between the images.

Figure 4:
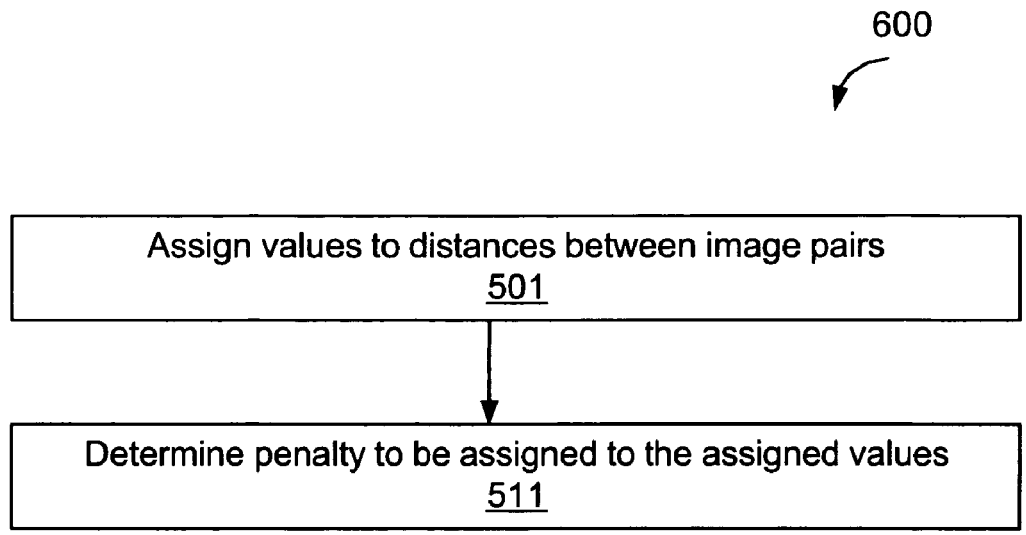
FIG. 4 is a high-level flow diagram showing a process of comparing image signatures, according to certain embodiments of the invention.

In alternative embodiments, the reduced wavelet signatures are compared without generating matrices approximating the original luminance matrices. FIG. 4 shows an example of the overall process 600 that may be performed by the search engine to compare reduced wavelet signatures generated at block 231. Method 600 takes advantage of the fact that if an element in the first of two signatures to be compared has a (x=x1,y=y1,z=z1) triple, where "z1" is equal to either '1" or "−1", and an element in the second signature has a (x=x1, y=y1,z=z2) triple, where "z2" is equal to either 1" or "−1", then the triples describe an element that would be in the same position if a luminance matrix (or an approximation thereof) were to be constructed. Further, it is sufficient to store only the sign of the value coefficient "z" in the triple, instead of the coefficient itself.

At block 501, for two wavelet signatures "w1" and "w2" associated with pictures "A" and "B" to be compared respectively, a value "sum1" is assigned to a distance function from picture A to B, and a value "sum2" is assigned to a distance function from picture B to A. A "distance function" (also known as a "metric" or "distance") is a function "d(p,q)" of two points "p" and "q" which satisfies the following conditions:

$$d(p,q) \geq 0 \text{ and } d(p,q)=0 \text{ (if and only if } p=q)$$

$$d(p,q)=d(q,p)$$

$$d(p,q) \leq d(p,r)+d(r,q)$$

At block 511, for image pair (A,B), a coefficient "i" stored in the reduced wavelet signature w1 is compared to a coefficient "j" stored in the reduced wavelet signature w2, if there exists (i,j), such that the triple (x,y,z) stored in w1(i) has the same x and y values as the triple (x,y,z) stored in w2(j). If the z values differ in sign, then a penalty ("p") is given to both sum1 and sum2. Otherwise, no penalty is given. For all the remaining triples (x,y,z) stored in w1(i) that do not have the same x and y values as the triple (x,y,z) stored in w2(j), a penalty is added to the corresponding sum. In certain embodiments, penalties are computed relative to the position of the difference between the coefficients to account for the fact that differences in certain areas of an image may be less relevant than differences in other areas. For instance, it may be determined that a central area of an image is more important than an outlying area. In certain embodiments, computing distances between two reduced size wavelet signatures is implemented as follows:

```
*************************************************
*
* while (i1<REDUCEDSIZE && i2<REDUCEDSIZE)
*   {
*     p1=table[i] .sig[i1] .xpos+128*table[I] .sig[i1] .ypos;
*     p2=table[j] .sig[i2] .xpos+128*table[j] .sig[i2] .ypos;
*     if (p1==p2)
*       {
*         if(table[i] .sig[i1] .val!=table[j] .sig[i2] .val)
*           {
*             I1=Iqcache[table[i] .sig[i1] .xpos];
*             I2=Iqcache[table[i] .sig[i1] .ypos];
*             sum1+= weights [type] [MIN (Max (I1, I2), q)];
*             sum2+= weights [type] [MIN (Max (I1, I2), q)];
*           }
*         i1++;
*         i2++;
*       }
*     else
*       if (p1<p2)
*         {
*           I1=Iqcache[table[i] .sig[i1] .xpos];
*           I2=Iqcache[table[i] .sig[i1] .ypos];
*           sum1+= weights [type] [MIN (Max (I1, I2), 5)];
*           i1++;
*         }
*       else // if p2>p1
*         {
*           I1=Iqcache[table[i] .sig[i1] .xpos];
*           I2=Iqcache[table[i] .sig[i1] .ypos];
*           sum2+= weights [type] [MIN (Max (I1, I2), 5)];
*           i2++;
*         }
*   }
*
*************************************************/
```

In the above software code, "xpos" refers to the X coordinate of the i-th element of the wavelet for an image "i." Similarly, "ypos" refers to the Y coordinate of the i-th element of the wavelet for the image i. "Lqcache" is a logarithmic function of the distance from the center of the image i. The term "q" is the minimum penalty weight. "Weights" maps the logarithm to a weight in the set [0,q]. L1 and L2 vary with the distance from the image center.

At block 251, based on the results of the signature comparison, the similarity between images is detected. In one embodiment, a minimum vale of the two values of sum1 and sum2 is selected to represent a quantization of the similarity between the two images A and B, because getting false negatives (the case in which two near duplicate images are not detected as such) is preferable to getting false positives (the case in which two images are not near duplicates are detected as being near duplicates). In certain embodiments, images that have a similarity number that is higher than a set threshold, are deemed to be near duplicates of each other.

At block 261, according to certain embodiments, similar images are then clustered together. Images can be clustered together based on a notion of transitivity. Thus, if image A is a near duplicate of image B, which is a near duplicate of image C, then A is considered to be a near duplicate of image C. Accordingly, images A, B, and C can be clustered together, and a representative chosen (e.g., image A) to represent the cluster of images in an image search result display. The representative can be selected from the cluster based on, for instance, the quality of the image, compression value, and so forth the remaining images in the cluster (images B and C) can be made accessible by clicking on a data pointer (such as a hyperlink), or can be eliminated.

Figure 5:
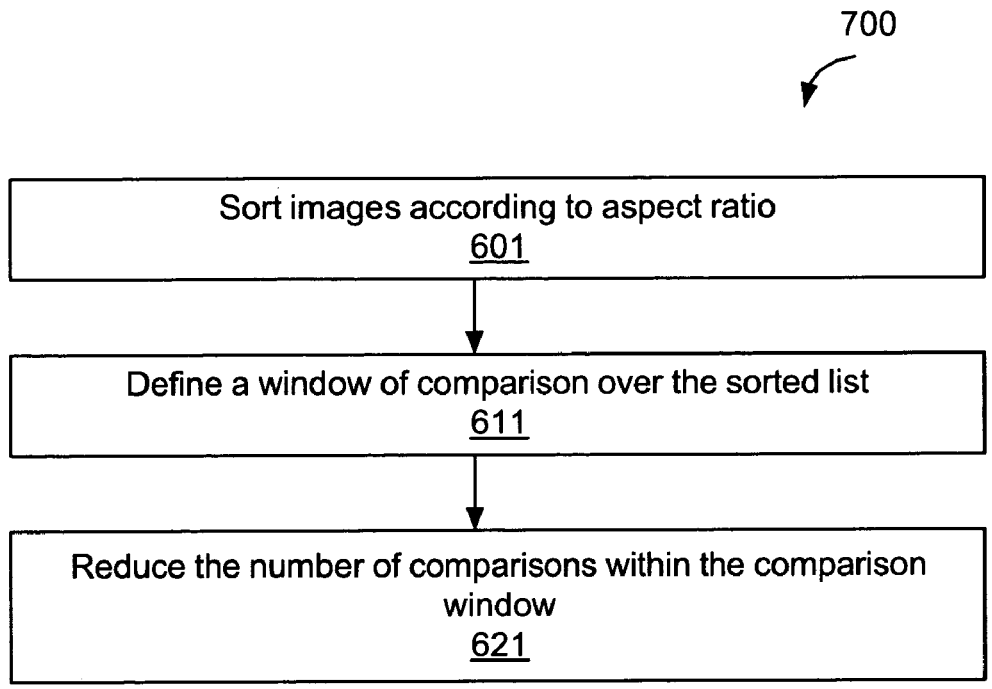
FIG. 5 is a high-level flow diagram showing a process of reducing the number of computations required to detect near duplicate images in a large collection of images, according to certain embodiments of the invention.

Search engines typically deal with billions of images. FIG. 5 shows an example of the overall process 700 that may be performed by the search engine 230 to reduce the number of computations required to process a large set of images, for instance, received as a result of searching using the image search term.

At block 601, the images are sorted according to the aspect ratio. Sorting images in this way reduces the number of comparisons without affecting the quality of the similarity detection algorithm, because it is highly probably that pictures that differ largely in aspect ratio are not similar. In other embodiments, some other pre-aggregation features could be chosen, as well.

Figure 6:
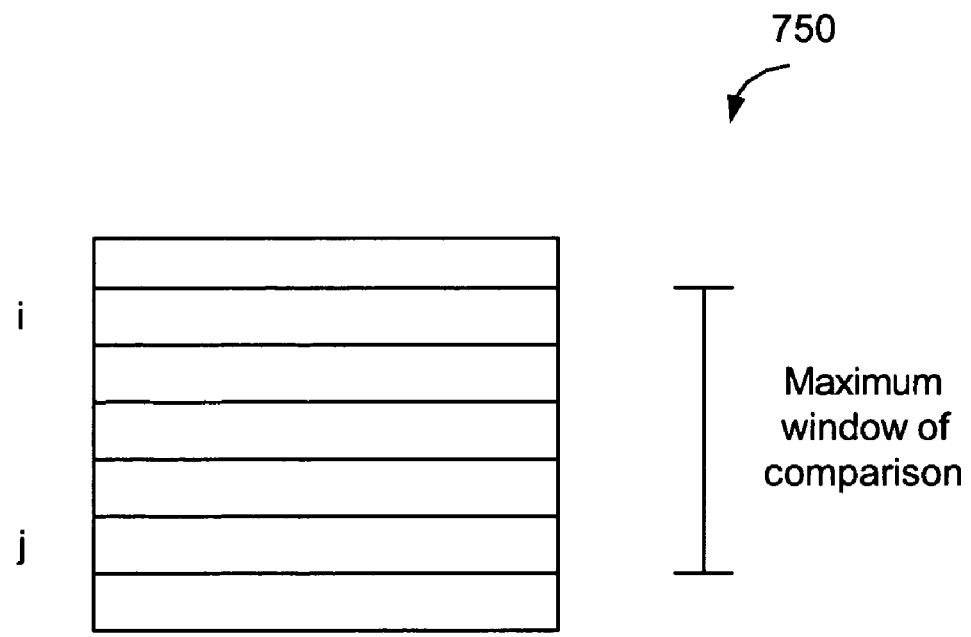
FIG. 6 illustrates a window of comparison, according to certain embodiments of the invention.

At block 611, a dynamic window of comparison 750, as shown in FIG. 6, is defined over the sorted list of images for comparing the images. To create the window, a list of elements is sorted according to a certain value "V" in increasing order. That is, if V of a first element in the list is less than V of a second element of the list, then the first element comes before the second element in the list of the elements. For each element "p(i)" in the list, comparisons are made with all the elements "p(i−1)," "p(i−2)" . . . "p(i−k)," such that V(p(i)) minus V(p(i−k)) is less than or equal to a threshold and V(p(i))−V(p(i−k−1)) is greater than the threshold. The window 750 can be tuned to adapt the computation for precision vs. time. In one embodiment, V is the aspect ratio of the images. Window (i,j) 750, as illustrated in FIG. 6, covers all images with an aspect ratio such that AR(j) divided by AR(i) is less than a threshold AR, where AR>1, and results in pre-clustering of images based on aspect ratio.

At block 621, the number of comparisons within the comparison window are reduced. According to certain embodiments of the present invention, two pictures are not compared and therefore, not considered to be similar, if the mean value of at least one the chroma channels (red, green, or blue) differs by more than a set chroma threshold. Alternatively, or in addition, other skipping strategies within the comparison window 750 may be adopted by using the mean values other features like YUV, hue, and saturation.

The number of comparisons can be further reduced by assuming that similarity has a transitive property. Accordingly, it is assumed that if image A is similar to image B with a confidence value "t", and image B is similar to image C with the confidence value t, then image A is similar to image C with a confidence value t. Another way of expressing this property is via the concept of equivalence class. In mathematics, given a set "X" and an equivalence relation "~ on X", the equivalence class of an element "a" in X is the subset of all elements in X which are equivalent to a. Thus, if X is the set of all cars, and "~" is the equivalence relation "has the same color as", then one particular equivalence class consists of all green cars. Accordingly, each image can belong to no more than one equivalence class. Each image first belongs to an equivalence class made of a single element, the image itself. Equivalence classes can be merged based on the transitive property.

Further enhancements can be made to the methods described in order to increase processing speed. For instance, the computation costs of detecting similarity in a large collection of images can further be reduced by storing image signatures only for popular images that are most likely to appear in the top results of an image query, instead of storing all image signatures.

Figure 7:
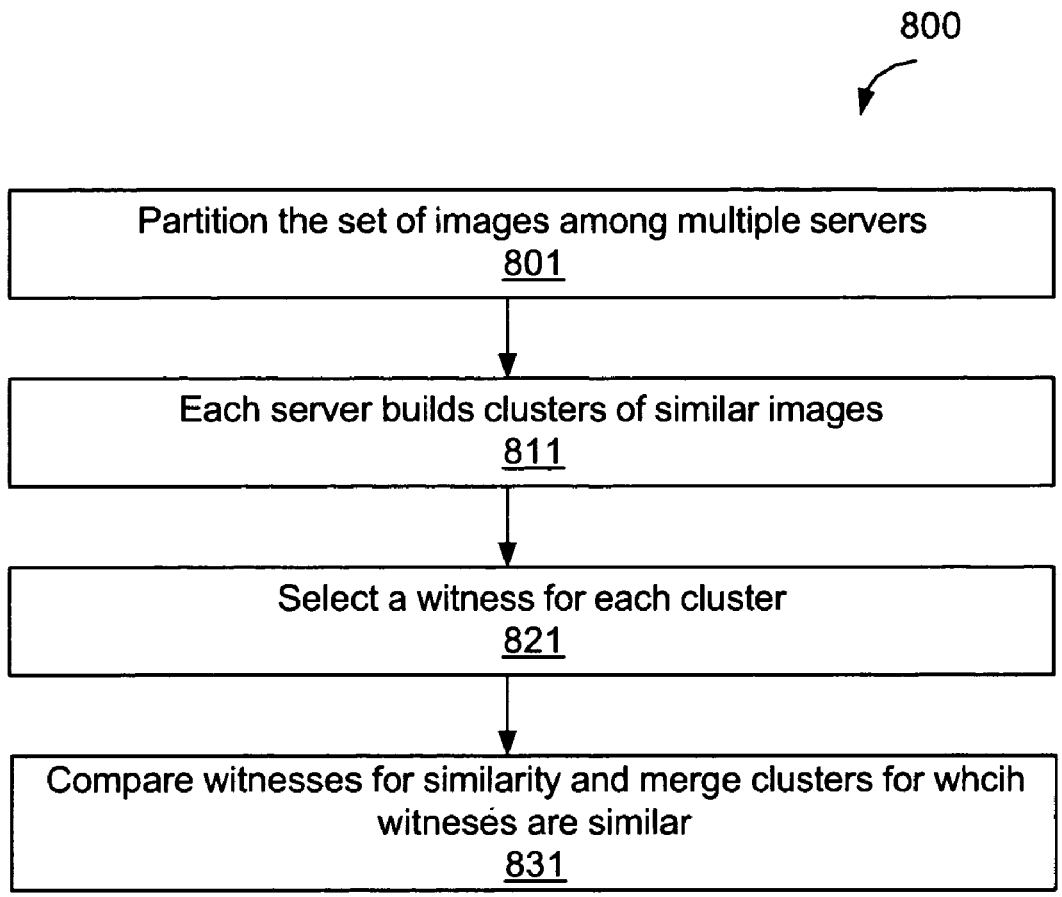
FIG. 7 is a high-level flow diagram showing a process of detecting near duplicate images in a large collection of images off-line, according to certain embodiments of the invention.

As discussed above, instead of performing the entire similarity detection algorithm 300 on-line in response to a query being submitted to the search engine 230, at least a portion of the similarity detection computations can be made off-line, e.g., when searching an offline database of images. FIG. 7 shows an example of the overall process 800 that may be performed by the search engine 230 to reduce computational costs while processing a set of N images off-line.

At block 801, the set of N images is partitioned among a set of m distributed serves. According to certain embodiments of the invention, the N images are partitioned over the m servers according to one or more partiion criteria, such as internal features extracted from the images. These internal features include aspect ratio, or the mean chroma channel values. In this way, a server can receive those images that have similar features.

At block 811, each server builds clusters of similar images. Each cluster includes images which are similar to each other above a similarity threshold.

At block 821, a single image is selected as representative of each cluster. This images is known herein as the "witness" of the cluster. The witness can be selected form the cluster based on, for instance, the quality of the image, compression value, and so forth.

At block 831, witnesses of clusters from multiple servers are compared to detect similarity, e.g, by using method 200. If two witnesses are determined to be similar, using an idea of transitivity, the respective clusters are merged. This agglomerative clustering process is repeated in a bottom-up fashion and can involve communication among servers, e.g., when the witnesses to be compared are placed in different servers.

According to certain embodiments of the present invention, instead of performing similarity detection entirely on-line or entirely off-line, a hybrid technique can be used, in part, to reduce the amount of communication needed between servers in off-line computation.

According to certain embodiments of the present invention, the results of similarity detection between images can be used in various ways. One advantageous way involves determining the popularity or ranking of an image on the World Wide Web. Typically, the popularity of a Web page is determined based on the content of the page and on a determination of how much a query is related to the content of the Web page. An alternate method typically used in determining the popularity of a web page is to determine how many other web pages link to the web page.

Determining similarity between images can be used to determine the popularity or ranking of an image. Accordingly, if there are multiple images that are very similar to an image, then it can be determined that the image is very popular. This makes sense, because popular images are posted on many web pages. Often, such posts are not duplicates of each other, and are instead just very similar to each other. For instance, a popular Compact Disk (CD) cover can be scanned in multiple times and posted on different web pages, with the resultant posts being very similar to each other, but not exact duplicates. In this way, the true popularity of an image, e.g., the image on the CD cover, can be determined.

Also, a typical method to find web pages is to use a link from a first web page to find a second page. According to certain embodiments of the invention, if two web pages contain images that are determined to be similar, then the web pages can be clustered together. This way web pages can be clustered together even if they do not share similar text (for instance, are written different languages) or they do not have links in common. Thus, an image can be used to find and reach web page containing similar images.

Yet another way of using the image similarity detection is to reduce the number of images displayed by a search engine when searching for an image search term. Thus, when image search results are displayed, instead of multiple images being shown that are substantially the same (e.g. images 101-105 in FIG. 10), a thumbnail of a representative image is displayed. In this way, the user views a few very different images, rather than many similar images. For instance, for FIG. 10, a representative 101 can be chosen for the cluster of similar images 101-105. The representative may be chosen based on quality factors, such as popularity of image, because it is a better quality picture, or because it comes from a popular host URL.

The display 100 then would show images 101, 106-113. In one embodiment, when the user clicks on image 101, the cluster of images 101-105 can be displayed. This method makes the image search result display more user friendly. Of course, alternative sources for downloading similar images, can be provided on request.

The image similarity methods can be also used to enrich Web pages embedding similar images. In one embodiment, if an image A is similar to an image B that is similar to an image C, suppose that C is chosen as a witness of the cluster ABC. For instance, image C can be chosen over image A or image B because it is a better quality picture or because it comes from a popular host URL. The words in text surrounding images A and B can be added to image C, such that even if the words are not present in the text surrounding C, image C can be retrieved using the words attached to A or B. For e.g., suppose the text "Madonna the singer" is an anchor "AH1" pointing to image A, "Madonna the music artist" is an anchor "AH2" pointing to image B, and "Madonna the hits-maker" is an anchor "AH3" pointing to image C. If C is chosen to be the witness, the anchors AH1, AH2, AH3 can be associated with image C. This way, a search term corresponding to one of the three anchors will result in image C being shown. Alternatively, or in addition, only the most common words in the surrounding texts are boosted. For instance, the most common words are boosted and a score is added to each word. For e.g., If the text surrounding image A states "John Doe on holiday" and that of the description of another page referring to the same photo states "John Doe fishing by the seaside", the following words can be associated to the context of an image chosen to be witness of the cluster containing images A and B: John-2, Doe-2, holiday-1, seaside-1. These methods are advantageous in that the context of images is enriched, because the context matches with more terms. Furthermore, ranking is improved. For instance, if someone searched for "John Doe", that image is more likely to be a suitable result than others because the term "John Doe" has a score of two. Therefore, in this case, there is a very high likelihood that the image shown is that of John Doe. Alternatively or in addition, other attributes of an image can also be associated with similar images to enrich the Web pages.

Image similarity detection methods can also be used to provide a multi-layer graphical representation of images, web pages, and user click selection. The multi-layer graphical representation exploits the fact that copied images can be understood as a kind of a virtual link, so copying is considered the same as inducing an implicit graph between images. The graphical representation can be used for image searching and clustering. In one understanding of the Web, it is modeled as a directed graph, and is commonly known as "Web Graph". A directed graph (also known as a diagraph) is a graph whose edges are ordered pair of vertices. That is, each edge can be followed from one vertex (called the "source") to another vertex (called the "target"). An edge is a connection between two vertices of the graph. In a weighted graph, each edge has an number, called a "weight." In a directed graph, an edge goes from the source to the target and hence makes connection in only one direction.

Figure 8:
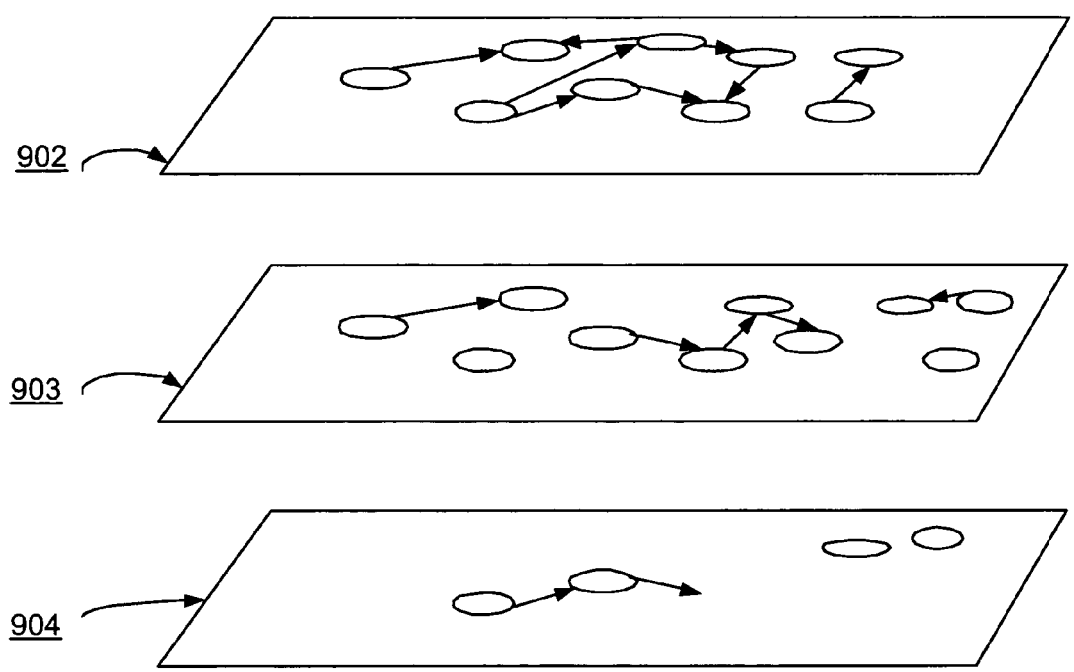
FIG. 8 illustrates a graphical representation of the Web.

The static Hypertext Markup Language ("HTML") pages are the vertices of the graph and hyperlinks between these pages are the edges. Each edge is annotated with the text portion surrounding the hyperlinks, known as an anchor. A representation of a Web Graph is illustrated in FIG. 8 as reference number 902. Click through web page graph "CWG=(CWQ, CWN, CWE)" is a direct graph where vertices have two distinct sets. CWQ is a set of user queries and CWN is a set of web pages selected in response to the queries. A direct edge CWE from a vertex in a CWQ to a vertex in CWN represents that a user clicks the displayed web page result. Click-through web page graph CWG may be the same as web graph WG, in which case there would be links between the two layers. A representation of a Graph is illustrated in FIG. 8 as reference number 903.

A click-through image graph "CIG=(CIQ, CIN, CIE)" is a direct graph where vertices have two distinct sets. CIQ is a set of user queries and CIN is a set of images selected in response to the queries. A direct edge from a vertex in a CIQ to a vertex in CWN represents that a user clicks the displayed image result. Click-through image graph CIG may share the same key words with the click-through web graph CWG, in which case there would be links between the two layers. A representation of a Graph is illustrated in FIG. 8 as reference number 904.

According to certain embodiments of the present invention, a new similarity layer represented by a direct graph "G=(V,E)" is defined. The set of vertices V represents images and the set of direct edges E represent the degree of similarity between different vertices. Click-through image graph CIG may have the same images as the graph G, in which case there would be links between the two layers.

Figure 9:
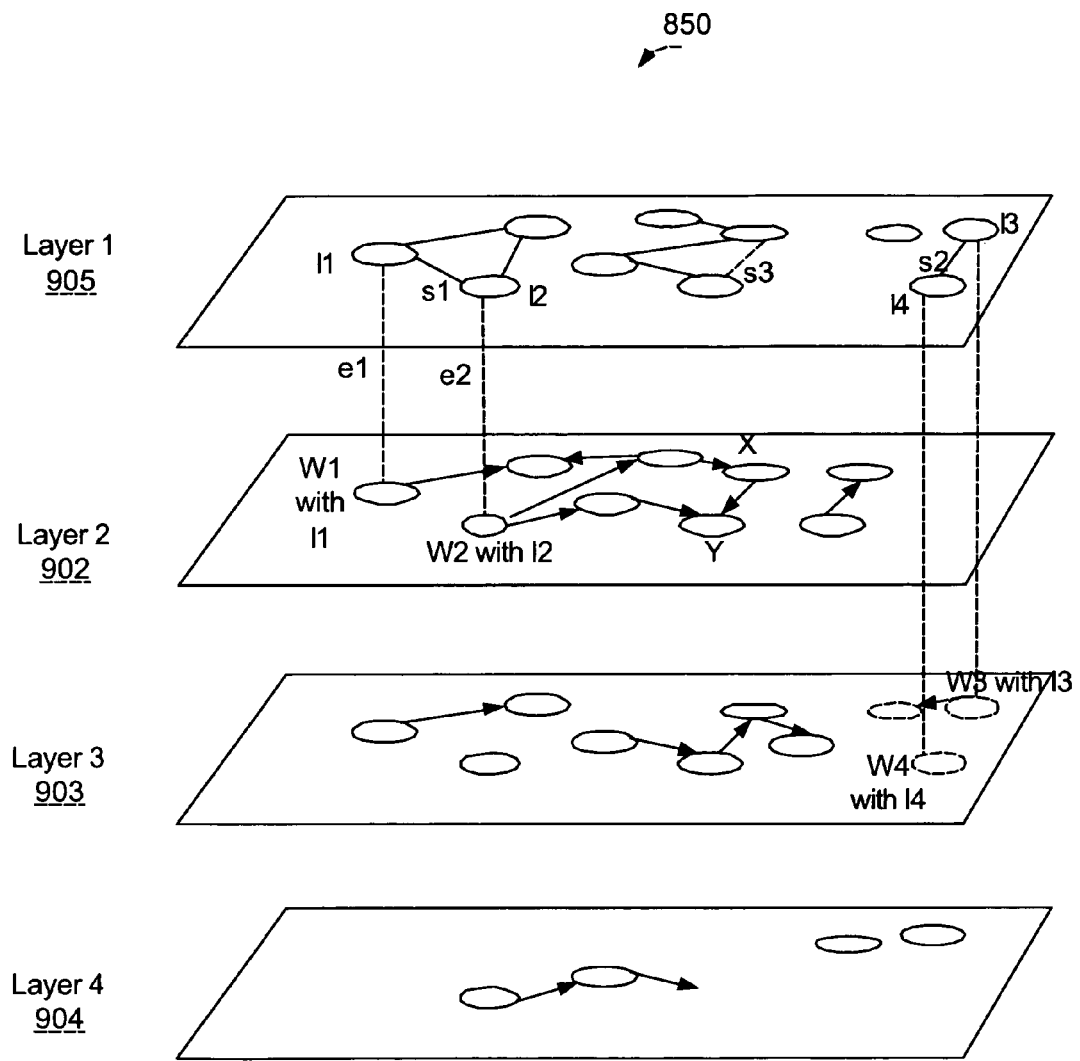
FIG. 9 illustrates new layer added to the graphical representation of the Web, according to certain embodiments of the invention.

FIG. 9 illustrates a multi-layer graph 850 obtained by combining the four layers mentioned above. Layer 905 is the image similarity layer, layer 902 is the web graph layer, layer 903 is the click-through web page graph layer, and layer 904 is the click-through image graph layer.

If an image in layer 905 is embedded in a web page in layer 902, then there is a link between the two layers. For instance, if two images "I1" and "I2" are present in both layers 905 and 902 (as embedded in web pages "W1" and "W2" respectively), two undirected edges exist between the two layers, as illustrated in FIG. 9 as edges "e1" and "e2." Thus, the similarity relationship between I1 and I2, represented by edge "s1" in layer 905, can be exploited in layer 902, when there is otherwise no link between the two web pages W1 and W2 in layer 902. These edges can be annotated with a weight that represents the level of similarity between images.

Analogously, the similarity relationship between two images "I3" and "I4", represented by the edge "s2" in layer 905, can be exploited in layer 903, where there is no direct link between two web pages "W3" and "W4" containing images I3 and I4 respectively.

The graph 850 can be used to group together and also rank images having common features. Further, the graph G can be used to present a user with one representative images from a group of similar images, so as to not overwhelm the user with an overabundance of redundant information. The entire cluster can be displayed on the user's request.

In particular, the graph 850 can be used for structural clustering of images that are structurally similar in their picture presentation. This is indicated by connections between images, e.g. images I1 and I2 are structurally similar to each other with similarity s1. Also, the graph 850 can be used for semantic-based clustering of images. Thus, if two web pages (e.g. X and Y) in web graph layer 902 are similar in text, then it can be inferred that the images embedded in the two web pages are similar. Such a decision can be bolstered by using the degree of similarity ("s3") between the images in layer 905. In this way, the context of images that are near duplicates can be used to further bolster the ranking or popularity of images. Furthermore, anchor texts of two web pages (e.g., X and Y) in layer 902 can also be used in the same manner to cluster images semantically.

According to certain embodiments of the invention, semantic-based clustering can also be achieved through interaction between layers 905 and 903 and between layers 904 and 902. Thus, if two images in layer 903 have common text queries leading to the click selection, then these images may be considered similar. For instance, if a query "Q" leads to the selection of images "A" and "B" a number "p" of times, where p is greater than a set threshold number, then the images A and B can be determined to be semantically similar. Similarly, semantic clustering of web pages using layer 904 common queries is also possible.

According to certain embodiments of the invention, semantic-based clustering can also be achieved through interaction between all layers 905, 902, 903 and 904. The clustering of images can be combined for more accuracy in image clustering. For instance, the following set of images can be considered to be in the same cluster: a) a set of p common queries leads to the same set of images to be selected or images are in layer 905 with similarity scores that exceed a set threshold; b) a set of "q" common queries leads to the same set of web pages containing images to be selected or web pages containing images are in layer 902 that are considered similar; c) images are embedded in one or more web pages considered in b) and these images are considered semantically related in a). Authoritativeness of web pages can be calculated in multiple ways. For instance, an algorithm called "PageRank" that analyzes web links off-line without considering the web topics or the user's query can be used. Another algorithm called "HITS" that judges web pages on-line according to the user's query can also be used. The new layer 905 can provide a way of reinforcing image authoritativeness. Specifically, images in layer 905 that are embedded in a web page in layer 902 is considered to have inherited link authoritativeness in layer 902. The identification of near duplicate images in layer 905 can be used to strengthen the authority scores of these images. Specifically, the confidence score of image similarity can be incorporated in authority score computation. For instance, if two images X and Y are similar with a confidence score "C", the combined authoritative score can be (score(X)+score(Y))*C.

Figure 10:
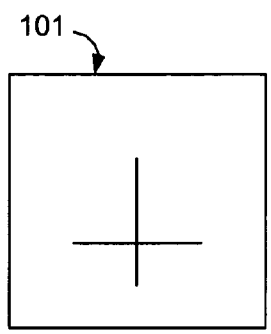
FIG. 10 illustrates a web page of results to a search query.
Figure 10:
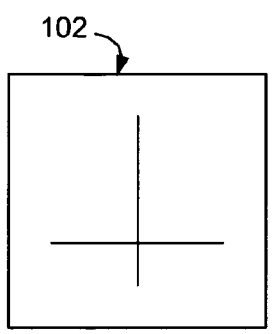
Figure 10:
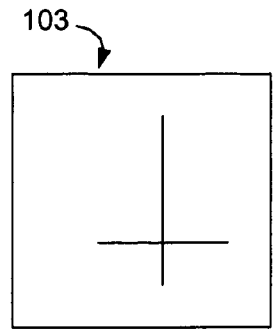
Figure 10:
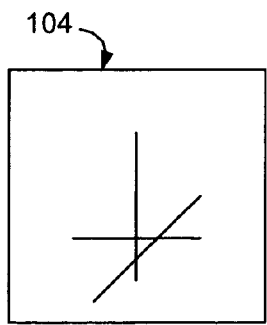
Figure 10:
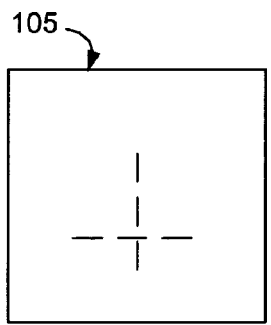
Figure 10:
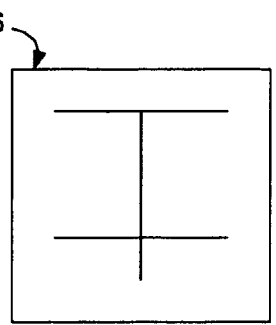
Figure 10:
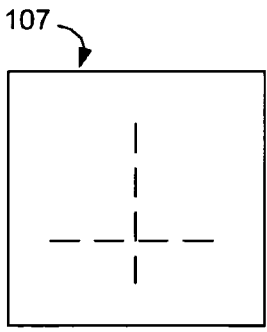
Figure 10:
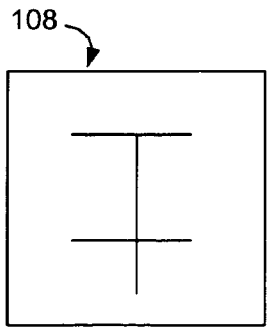
Figure 10:
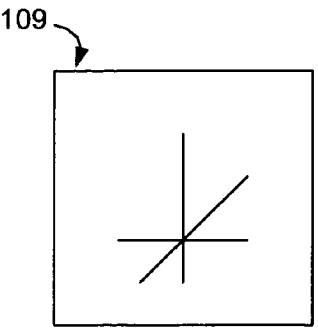

FIG. 10 shows a sample of search results 100 that may be displayed for the search term "Intersecting lines" using a search engine that does not include a near-duplicate image detection method. As depicted in FIG. 10, multiple images are displayed, which look very similar to the human eye. For instance, images 101, 102, and 103 appear very similar to each other. Image 102 appears to be simply a larger version of image 101, while image 103 appears to be a shifted version of image 102. Also, images 107 and 106 appear to be larger versions of images 105 and 108.

Figure 11:
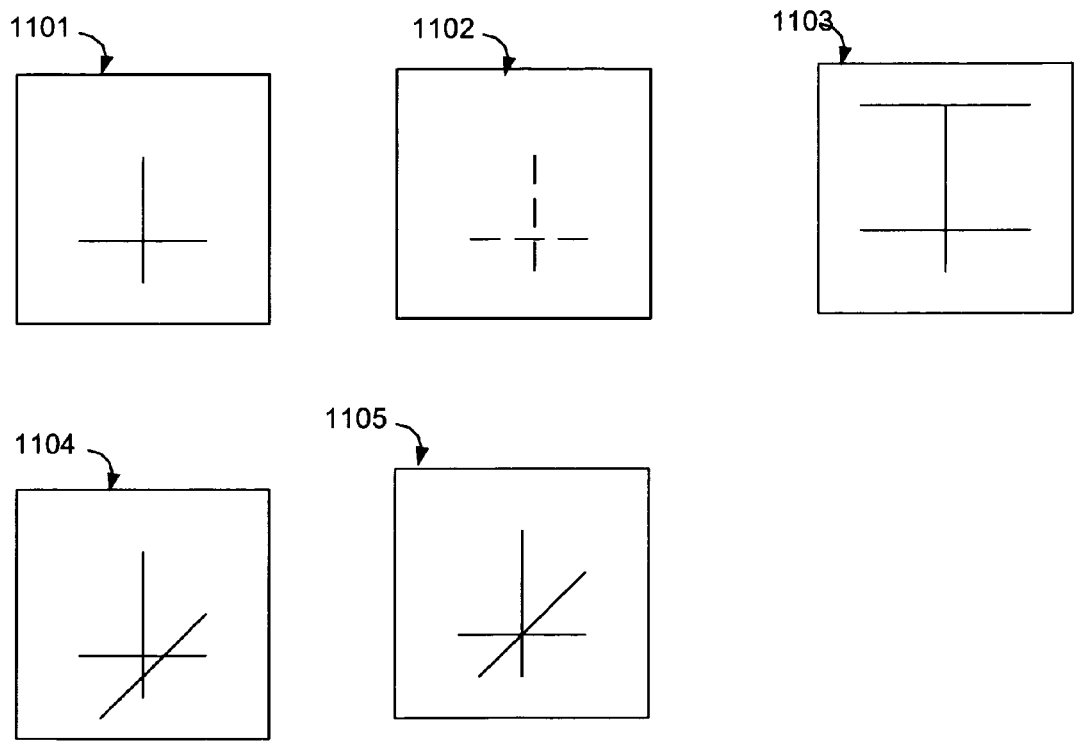
FIG. 11 illustrates a web page of results to a search query, according to certain embodiments of the invention.

FIG. 11 is an example of a web page illustrating image search results upon using similarity image detection methods. As shown in FIG. 11, witnesses or representatives of various clusters are displayed. For instance, image 101 from the cluster of 101-103 is displayed as image 1101. Image 102 from the cluster of images 105 and 107 is displayed as image 1102. In this embodiment, images are displayed in an order corresponding to the popularity of the image as measured by the number of times the image or near duplicates of the image appear in the image search result list.

Figure 12:
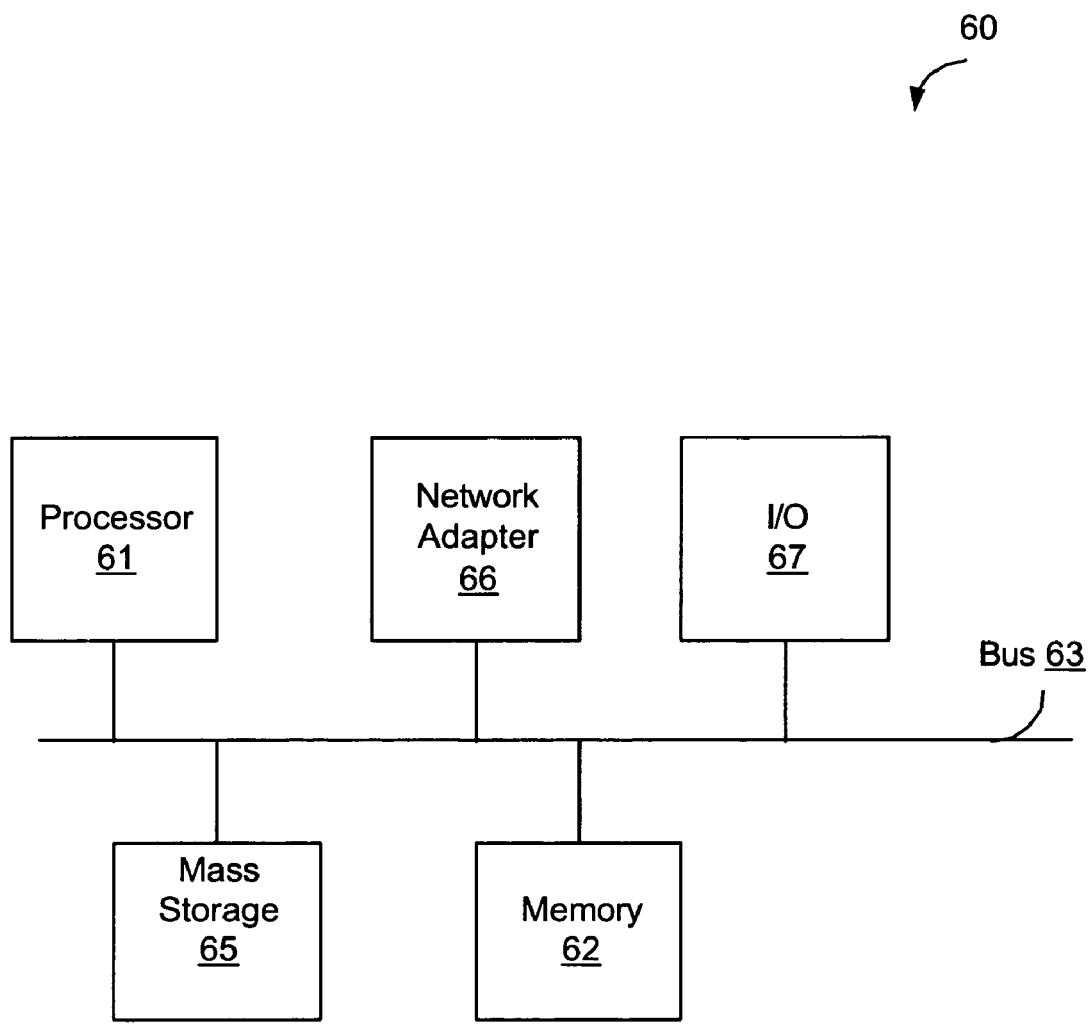
FIG. 12 is a high-level block diagram of a processing system that may be used to effect various operations of the present invention.

As indicated above, the techniques introduced herein can be implemented in software, either in whole or in part. FIG. 12 is a high-level block diagram showing an example of the architecture of a processing system, at a high level, in which such software can be embodied. In certain embodiments, the processing system 60 is a search engine 130. In still other embodiments, the processing system 60 is content provider server or client. Note that certain standard and well-known components which are not germane to the present invention are not shown.

The processing system 60 includes one or more processors 61 and memory 62, coupled to a bus system 63. The bus system 63 shown in FIG. 12 is an abstraction that represents any one or more separate physical buses and/or point-to-point connections, connected by appropriate bridges, adapters and/or controllers. The bus system 63, therefore, may include, for example, a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 61 are the central processing units (CPUs) of the processing system 60 and, thus, control its overall operation. In certain embodiments, the processors 61 accomplish this by executing software stored in memory 62. A processor 61 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 62 represents any form of random access memory (RAM), read-only memory (ROM), flash memory, or the like, or a combination of such devices. Memory 62 includes the main memory of the processing system 60. Memory 62 may store software which implements the techniques introduced above.

Also connected to the processors 61 through the bus system 63 are one or more internal mass storage devices 65, and a network adapter 66. Internal mass storage devices 65 may be or include any conventional medium for storing large volumes of data in a non-volatile manner, such as one or more magnetic or optical based disks. The network adapter 66 provides the processing system 60 with the ability to communicate with remote devices (e.g., clients 1) over a network and may be, for example, an Ethernet adapter, a Fibre Channel adapter, or the like. The processing system 60 may also include one or more input/output (I/O) devices 67 coupled to the bus system 63. The I/O devices 67 may include, for example, a display device, a keyboard, a mouse, etc.

Thus, a method for detecting near duplicates of images in a collection of images has been described. The method involves computation and comparison of image signatures to determine similarity. Fast similarity detection methods with approximation are also introduced to be used in large-scale image repositories. The similarity detection methods can be implemented on-line, e.g., in response to an image query, or off-line for data mining. The similarity detection methods are used to create a new layer to be used to create a multi-layer representation of images, web pages, and user click selection. The multi-layer representation can be used for image clustering and ranking.

Note that references throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the invention, as will be recognized by those of ordinary skill in the art. Furthermore, instead of performing overall processes as described in reference to flowcharts, the search engine may only perform only parts thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A computer system, comprising:
   a communication network;
   a client connected to the communication network, the client having an input/output interface to submit a query;
   a server connected to the communication network, the server having an input/output interface to receive a query from the client;
   a database of images, wherein the data base is resident in the server;
   a search module resident in the server, wherein the search module is configured to:
   search the database utilizing the query to locate a set of images that match the search query;
   analyze each image included in the set of images to determine whether any images included in the set are near duplicates of one another, wherein the analysis includes a pre-processing of the images included in the set of images, the pre-processing including:
      gathering statistics for each image in the set of images, wherein the statistics include at least one of an aspect ratio associated with an image and a mean value for each chroma channel in the red-green-blue color space associated with an image;
      scaling each image in the set of images to a uniform size; and
      computing a luminance matrix for each scaled image in the set of images, wherein the luminance matrix includes a weighted sum of linear red-green-blue color components of image;
   determine the number of near duplicate images included in the set of images for each image in the set of images;
   determine a popularity level of a particular image in the set of images based on the number of near duplicate images for the particular image found in the set of images;
   rank the images included in the set of images according to their determined popularity level with a higher popularity level placed higher in the search result; and
   providing the ranked list of images to the client in response to the query.

2. The system recited in claim 1, wherein the search engine is configured to cluster images determined as being near duplicates of each other.

3. A method for determining near duplicate images in a set of images, the method comprising:
   pre-processing the set of images, wherein the pre-processing includes:
      gathering statistics for each image in the set of images, wherein the statistics include at least one of an aspect ratio associated with an image and a mean value for each chroma channel in the red-green-blue color space associated with an image;

scaling each image in the set of images to a uniform size; and computing a luminance matrix for each scaled image in the set of images, wherein the luminance matrix includes a weighted sum of linear red-green-blue color components of image;

generating an image signature for each image in the set of images based on the pre-processing of the images;

comparing the generated image signatures to generate an indication of similarity of images in the set of images;

determining, based on the indication of similarity, whether two or more images in the set of images are near duplicates of one another; and associating an anchor corresponding to a first image to a second image determined to be a near duplicate of the first image, wherein the anchor is a word in text surrounding the first image.

4. The method recited in claim 3, wherein the set of images is at least a subset of images obtained by a search engine upon searching for an image search term.

5. The method recited in claim 3, wherein generating an image signature for each images in the set of images comprises:

creating a signature for each image in the set of images; and
reducing the size of the signature.

6. The method recited in claim 3, wherein comparing the generated image signatures comprises:

determining distances between the generated image signatures.

7. The method recited in claim 3, further comprising:
reducing the number of comparisons required for detecting near duplicate images within the set of images.

8. The method recited in claim 7, wherein reducing the number of comparisons required for detecting near duplicate images within the set of images comprises:

sorting the images according to aspect ratio;
defining a window of comparison over the sorted images; and
reducing a number of comparisons within the window of comparisons.

9. The method recited in claim 8, wherein reducing the number of comparisons required for detecting near duplicate images within the set of images located off-line comprises:

building clusters of images that are determined to be near duplicates;
selecting a representative of each cluster of images; and
merging two clusters of images when their respective representative are determined to be near duplicate images.

10. The method recited in claim 3, wherein reducing the number of comparisons required for detecting near duplicate images within the set of images comprises:

determining two images in the set of images to be near duplicates of each other when the two images are near duplicates of a third image in the set of images.

11. The method recited in claim 3, further comprising:
associating an attribute corresponding to a first image to a second image determined to be a near duplicate of the first image.

12. The method recited in claim 3, further comprising:
determining a popularity level of an image in the set of images based on the number of near duplicate images in the set of images.

13. A method for clustering a set of images, the method comprising:

pre-processing the set of images, wherein the pre-processing includes:

gathering statistics for each image in the set of images, wherein the statistics include at least one of an aspect ratio associated with an image and a mean value for each chroma channel in the red-green-blue color space associated with an image;

scaling each image in the set of images to a uniform size; and computing a luminance matrix for each scaled image in the set of images, wherein the luminance matrix includes a weighted sum of linear red-green-blue color components of an image;

generating an image signature for each image, based on the pre-processing;

comparing the image signatures to determine an indicator of similarity between the images, wherein the indicator of similarity is used to cluster images;

defining an image directed graph having the set of images as a set of vertices and the indicator of similarity as edges between the vertices, wherein the edges are annotated with a weight that represents a level of similarity between images; and linking the image directed graph with one or more layers of a graph comprising multiple layers, the layers including a web page directed graph having a set of web pages as a set of vertices and hyperlinks between the web pages as edges between the vertices, a click-through web page directed graph having a set of web pages selected in response to a query as a set of vertices and a selection of a subset from the set of web pages selected in response to the query as edges between the vertices, and a click-through image directed graph having a set of images selected in response to a query as a set of vertices and a selection of a subset from the set of images selected in response to the query as edges between the vertices.

14. The method recited in claim 13, wherein linking the image directed graph with one or more layers of the graph comprising multiple layers comprises:

determining edges between two images in the image graph based on the edges between web pages comprising the two images in any one of the web page directed graph, the click-through web page directed graph, and the click-through image directed graph.

15. A server implementing in hardware a search engine for determining whether two images are near duplicates, the search engine comprising:

a processor configured to pre-process the set of images, wherein the pre-processing includes gathering statistics for each image in the set of images, wherein the statistics include at least one of an aspect ratio associated with an image and a mean value for each chroma channel in the red-green-blue color space associated with an image;

an image scalar configured to scale scaling each image in the set of images to a uniform size;

a luminance matrix processor configured to compute a luminance matrix for each scaled image in the set of images, wherein the luminance matrix includes a weighted sum of linear red-green-blue color components of an image;

an image signature generator configured to generate an image signature for each image; and a comparison facility configured to determine whether the two images are near duplicate images based on their image signatures, the search engine associating an anchor corresponding to the first image to the second image when determined to be a near duplicate of the first image, wherein the anchor is a word in text surrounding the image.

16. The server recited in claim 15, wherein the image signature generator further comprises:

an image processor configured to compute an aspect ratio and a mean value for each primary color chroma channel.

17. The server recited in claim 16, wherein the image signature generator further comprises:

a wavelet transformer configured to generate a wavelet signature for each image.

* * * * *